United States Patent [19]

Matsuoka

[11] Patent Number: 5,060,181

[45] Date of Patent: Oct. 22, 1991

[54] CUBIC EQUATION CALCULATION APPARATUS AND CUBIC CURVE COORDINATE DATA GENERATION APPARATUS USING THE SAME

[75] Inventor: Sigeki Matsuoka, Suita, Japan

[73] Assignee: Ricoh Company, Ltd., Japan

[21] Appl. No.: 460,589

[22] Filed: Jan. 3, 1990

[30] Foreign Application Priority Data

Jan. 11, 1989 [JP] Japan .................................. 1-5697

[51] Int. Cl.$^5$ ........................... G06F 15/32; G06F 1/02
[52] U.S. Cl. ..................................... 364/735; 364/718
[58] Field of Search ................ 364/718, 720, 735, 518

[56] References Cited

U.S. PATENT DOCUMENTS 4,760,548 7/1988 Baker et al. .......................... 364/718
4,907,282 3/1990 Daly et al. ............................ 364/518

FOREIGN PATENT DOCUMENTS 62-79522 4/1987 Japan .
62-203229 9/1987 Japan .

Primary Examiner—Gary V. Harkcom
Assistant Examiner—Long T. Nguyen
Attorney, Agent, or Firm—Mason, Fenwick & Lawrence

[57] ABSTRACT

A cubic equation calculation apparatus calculates f(n) of a function when a cubic equation variable T=n is defined by $f(T)=AT^3+BT^2+CT+D$ where A, B, C and D are constants. The apparatus includes a first calculation circuit using a process where variable T is incremented by 1 from 1, for calculating coefficient data $A_n$, $B_n$, $C_n$ and $D_n$ when T=n (n=1, 2, ...) in accordance with $A_n=A_{n-1}$; $B_n=3A_{n-1}+B_{n-1}$; $C_n=3A_{n-1}+2B_{n-1}+C_{n-1}$; $D_n=A_{n-1}+B_{n-1}+C_{n-1}+D_{n-1}$; and using coefficient data $A_1$, $B_1$, $C_1$ and $D_1$ when T=1 being such that $A_1=A$, $B_1=B$, $C_1=C$ and $D_1=D$, and using coefficient data $A_{n-1}$, $B_{n-1}$, $C_{n-1}$ and $D_{n-1}$ when T=n−1. The apparatus also includes a second calculation circuit for calculating f(n) in accordance with $f(n)=A_n+B_n+C_n+D_n$ when T=n. A cubic curve coordinate data generation apparatus is provided, using the cubic equation calculation apparatus.

15 Claims, 4 Drawing Sheets

$f(T) = AT^3 + BT^2 + CT + D$

CUBIC EQUATION CALCULATION APPARATUS AND CUBIC CURVE COORDINATE DATA GENERATION APPARATUS USING THE SAME

BACKGROUND OF THE INVENTION

The present invention relates to a cubic equation calculation apparatus for calculating the value f(T) of a function T that is defined by $f(T) = AT^3 + BT^2 + CT + D$ where A, B, C and D are constants, and a coordinate data generation apparatus that uses this calculation apparatus to generate coordinates on cubic curves.

These apparatus are applicable to computer graphics or desktop publishing (DTP) and the like, and substitute parameters for the cubic equation to calculate coordinate on the display screen, and perform the screen display of smooth curves.

A cubic equation curve is defined by four representative points and in the case of two dimensions, can be generally expressed by $$x = B_1(t)x_1 + B_2(t)x_2 + B_3(t)x_3 + B_4(t)x_4 \quad (1a)$$

$$y = B_1(t)y_1 + B_2(t)y_2 + B_3(t)y_3 + B_4(t)y_4 \quad (1b)$$

In the case of three dimensions, the above formula have the factor $$z = B_1(t)z_1 + B_2(t)z_2 + B_3(t)z_3 + B_4(t)z_4$$

added.
For the sake of simplicity, the following description will be for the case of two dimensions.

The four points of $(x_1, y_1)$, $(x_2, y_2)$, $(x_3, y_3)$ and $(x_4, y_4)$ are the four representative points and $B_1(t)$, $B_2(t)$, $B_3(t)$ and $B_4(t)$ are the cubic equations for "t". The type of cubic curve that is obtained is determined by the cubic equations that are used for terms $B_1(t)$, $B_2(t)$, $B_3(t)$ and $B_4(t)$ in formula (1a) and (1b). For example, in the case of a Bezier curve, the cubic equations are $$B_1(t) = (1-t)^3$$

$$B_2(t) = 3t(1-t)^2$$

$$B_3(t) = 3t^2(1-t)$$

$$B_4(t) = t^3$$

These cubic equations are generally expressed as follows.

$$B_1(t) = at^3 + bt^2 + ct + d \quad (2-1)$$

$$B_2(t) = et^3 + ft^2 + gt + h \quad (2-2)$$

$$B_3(t) = it^3 + jt^2 + kt + 1 \quad (2-3)$$

$$B_4(t) = mt^3 + nt^2 + ot + p \quad (2-4)$$

The parameter "t" in these formula gradually increments from 0 to 1 to determine the curve. The amount of the increment is determined so that the printed or displayed output does not have missing pixels. If the amount of this increment is made $$\frac{1}{\alpha},$$

then the value of "t" successively changes through 0, $$0, \frac{1}{\alpha}, \frac{2}{\alpha}$$

and so on so that the formula (2−1) through (2−4) can be used to determine $B_1(t)$, $B_2(t)$, $B_3(t)$ and $B_4(t)$ and the values for these input to formula (1a) and (1b) to determine the values for x and y.

The following is a description of the method for the calculating $B_1(t)$, $B_2(t)$, $B_3(t)$ and $B_4(t)$.

$B_1(t)$, $B_2(t)$, $B_3(t)$ and $B_4(t)$ are all formula having the same format and so they can be calculated by the same method. Accordingly, only a description of the method of calculating $B_1(t)$ will be given below.

When T is defined as $T = \alpha t$, formula (2−1) becomes $$B_1(t) = B_1\left(\frac{T}{\alpha}\right)$$

$$= \frac{a}{\alpha^3} T^3 + \frac{b}{\alpha^2} T^2 + \frac{c}{\alpha} T + d$$

If $$A = \frac{a}{\alpha^3}, B = \frac{b}{\alpha^2}, C = \frac{c}{\alpha} \text{ and } D = d,$$

then the new cubic equation $B_1(T)$ becomes as follows.

$$B_1(T) = AT^3 + BT^2 + CT + D \quad (3)$$

where, $T = 0, 1, 2, \alpha$

When the cubic equation calculation indicated by formula (3) is performed, the conventional method has been to determine $T^2$ by the product of $T \times T$ and to determine $T^3$ by the product of $T^2 \times T$ and to use the values to determine $C \times T$, $B \times T^2$ and $A \times T^3$. The addition of D to the results of these multiplications enables the above function f(T) to be calculated.

This conventional method involves five multiplications and three additions. When these multiplications and additions are performed sequentially, the multiplications take about ten times more time than the additions and if the time required for the additions is h, then the total time required for the calculations is about 54h. Therefore, high-speed processing is not possible if there are many multiplication calculations.

FIG. 1 indicates a parallel processing circuit for the parallel processing of these calculations so that high-speed processing can be achieved. The calculation circuit indicated in FIG. 1 has five parallel multipliers 61 through 65 and three adders 66 through 68. The parallel multiplier 61 calculates $T \times T$, the parallel multiplier 62 calculates $T^2 \times T$, and parallel multiplier 63 calculates $T^3 \times A$. In addition, parallel multiplier 64 calculates $T^2 \times B$ and parallel multiplier 65 calculates $T \times C$. Moreover, adder 66 adds $AT^3$ from parallel multiplier 63 to $BT^2$ from parallel multiplier 64 to calculate the product $AT^3 + BT^2$ and adder 67 adds the results $AT^3 + BT^2$ of this addition and CT from parallel multiplier 65 to calculate the product $AT^3 + BT^2 + CT$. Then, adder 68 adds D to the $AT^3 + BT^2 + CT$ from adder 67 to calculate $AT^3 + BT^3 + CT + D$. The value calculated by adder 68 then becomes the final result $B_1(T) = AT^3 + BT^2 + CT + D$.

In the calculation circuit described above, the parallel multipliers require approximately five or six times the amount of hardware of the adders and so if the amount of hardware of the adders is 1, then the total amount of hardware is 28l to 33l. Accordingly, the amount of hardware becomes larger if the amount of parallel processing becomes larger.

SUMMARY OF THE INVENTION

Accordingly, it is a general object of the present invention to provide a novel and useful cubic equation calculation apparatus and a cubic curve coordinate data generation apparatus using such, in which the problems described heretofore are eliminated.

A more specific object of the present invention is to provide a cubic equation calculation apparatus and a cubic curve coordinate data generation apparatus using such that do not increase the amount of hardware and in which the processing time is shortened.

This object of the present invention is achieved by a cubic equation calculation apparatus for calculating f(n) of a function when a cubic equation variable $T = n$ is defined by $$f(T) = AT^3 + BT^2 + CT + D$$

Where A, B, C and D are constants, comprising, first calculation means for using a process where variable T is incremented by 1 from 1, for calculating coefficient data $A_n$, $B_n$, $C_n$ and $D_n$ when $T=n$ (1, 2, ...) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when $T=1$ being such that $A_1 = A$, $B_1 = B$, $C_1 = C$ and $D_1 = D$, and using coefficient data $A_{n-1}$, $B_{n-1}$, $C_{n-1}$ and $D_{n-1}$ when $T = n-1$, and second calculation means for using the results of calculation of the first calculation means for calculating f(n) in accordance with $$f(n) = A_n + B_n + C_n + D_n$$

when $T = n$.

The above object of the present invention is achieved by a cubic curve coodinate data generation apparatus, comprising, cubic equation calculation means for calculating f(n) of a function when a cubic equation variable $T = n$ is defined by $$f(T) = AT^3 + BT^2 + CT + D$$

where A, B, C and D are constants, the cubic equation specifying a cubic curve, and coordinate data calculation means for calculating coordinate data on the cubic curve on basis of f(n) calculated by the cubic equation calculation means, the cubic equation calculation means having first calculation means for using a process where variable T is incremented by 1 from 1, for calculating coefficient data $A_n$, $B_n$, $C_n$ and $D_n$ when $T=n$ (1, 2, ...) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when $T=1$ being such that $A_1 = A$, $B_1 = B$, $C_1 = C$ and $D_1 = D$, and using coefficient data $A_{n-1}$, $B_{n-1}$, $C_{n-1}$ and $D_{n-1}$ when $T=n-1$, and second calculation means for using the results of calculation of the first calculation means for calculating f(n) in accordance with $$f(n) = A_n + B_n + C_n + D_n$$

when $T = n$.

Another object of the present invention is to provide a cubic curve coordinate data generation apparatus for the generation of a more uniform distribution of coordinate data for cubic curves.

This object of the present invention is achieved by the cubic curve coordinate generation apparatus such as aforementioned further comprising, judgement means for outputting a control signal when the distance between neighboring points on the cubic curve which are specified by coordinate data calculated by the coordinate data calculation means becomes equal to or larger than a predetermined distance, and wherein the cubic equation calculation means further comprises, data conversion means for using results of calculation of the first calculation means for respectively converting $$\frac{A_n}{8}$$ into new coefficient data $A_n$, $$\frac{B_n}{4}$$ into new coefficient data $B_n$, $$\frac{C_n}{2}$$ into new coefficient data $C_n$, and $D_n$ into new coefficient data $D_n$, and data selection means for selective by supplying the result $A_n$, $B_n$, $C_n$ and $D_n$ of calculation of the first calculation means when said control signal is not output from the judgement means and coefficient data $A_n$, $B_n$, $C_n$ and $D_n$ obtained from the data conversion means when the control signal is output from the judgement means, to the second calculation means, and the second calculation means uses coefficient data $A_n$, $B_n$, $C_n$ and $D_n$ supplied from the data selection means to calculate f(n) in accordance with $$f(n) = A_n + B_n + C_n + D_n$$

when $T = n$.

DESCRIPTION OF THE PREFERRED EMBODIMENT

The following is a description of calculation principle in the cubic equation calculation apparatus according to the present invention.

In the previous formula (3), when $T=0$, $B_1(0)=D$ and when $T=1$, $B_1(1)$ can be determined as $B_1(1)=A+B+C+D$.

Then when $B_1(2)$ is determined, formula (3) can be rewritten as follows.

$$\begin{aligned} B_1(T+1) &= A(T+1)^3 + B(T+1)^2 + C(T+1) + D \\ &= AT^3 + (3A+B)T^2 + (3A+2B+C)T + (A+B+C+D) \end{aligned} \quad (4)$$

Substituting $T=1$ into formula (4) enables $B_1(2)$ to be determined. This is to say that $$B_1(2) = A + (3A+B) + (3A+2B+C) + (A+B+C+D)$$

is determined. This formula is rewritten in general form when the $(n-1)$'th cubic form coefficients become $A_{n-1}$, $B_{n-1}$, $C_{n-1}$ and $D_{n-1}$, the n'th cubic coefficients $A_n$, $B_n$, $C_n$ and $D_n$ become $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

Then, $B_1(T)$ when $T=n$, that is to say, $B_1(n)$ becomes $$B_1(n) = A_n + B_n + C_n + D_n$$

In the above, the formula for determining the coefficient $D_n$ must be the value of the $(n-1)$'th $B_1(T)$. Accordingly, it is desirable that the calculation for $D_n = B_1(n-1)$ is performed, since the amount of calculation is reduced. Rearranging this gives the following.

$$B_1(n) = A_n + B_n + C_n + D_n$$

$$A_n = A_{n-1}$$

$$B_n = 3A_{n-1} + B_{n-1} \quad (5)$$

$$C_n = 3A_{n-1} + 2B_{n-1} + C_{n-1}$$

$$D_n = B_1(n-1)$$

Where, $A=A$, $B=B$, $C_1=C$ and $D_1=D$.

Figure 1:
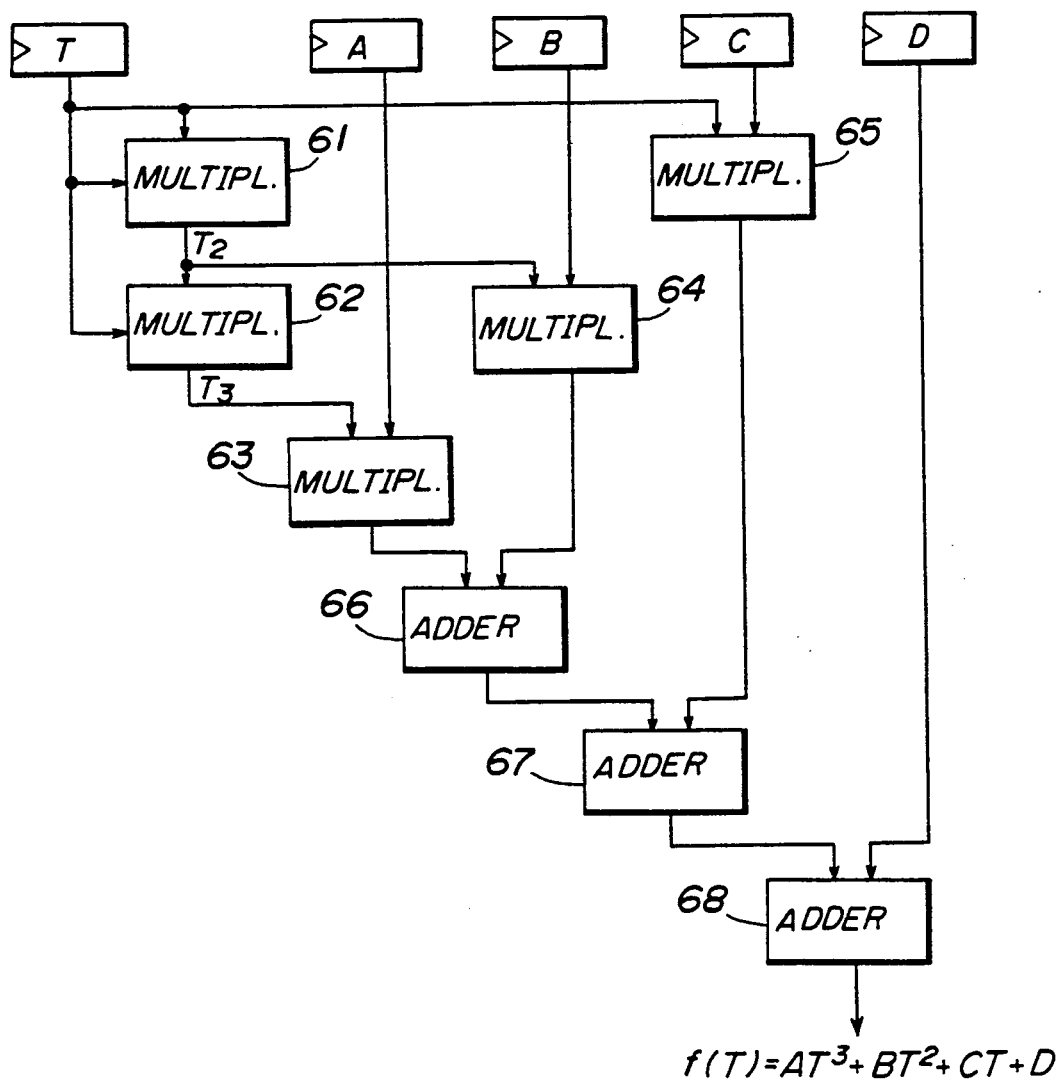
FIG. 1 is a circuit diagram indicating a conventional calculation circuit.
Figure 2:
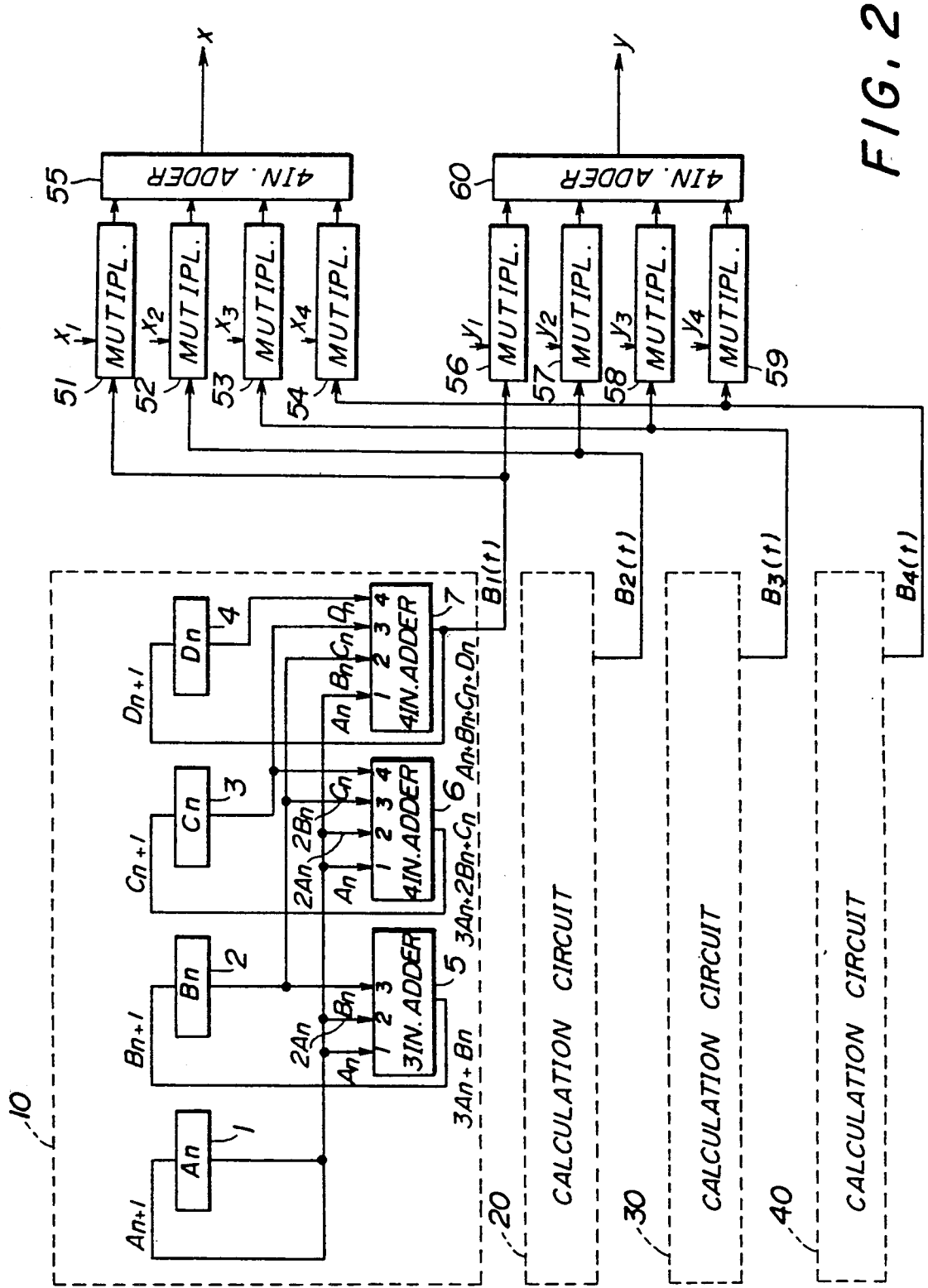
FIG. 2 is a circuit diagram indicating a first embodiment of a cubic equation calculation apparatus and a cubic curve coordinate data generation apparatus using such, according to the present invention.

A first embodiment of a cubic equation calculation apparatus and a cubic curve coordinate data generation apparatus using such, according to the present invention is shown in FIG. 2. This embodiment is a two-dimensional coordinate data (x, y) calculation apparatus that calculates two-dimensional coordinate data on the basis of the previously described formula (1a) and (1b).

The calculation circuits 10, 20, 30 and 40 perform the calculation of $B_1(t)$, $B_2(t)$, $B_3(t)$ and $B_4(t)$ in accordance with the above formula (5). The configurations of the calculation circuits 10, 20, 30 and 40 are the same and is described in terms of calculation circuit 10.

Registers 1, 2, 3 and 4 store 8-bit coefficient data $A_n$, $B_n$, $C_n$ and $D_n$. The coefficient data $A_n$ stored in the register 1 is returned as it is as the new coefficient data $A_{n+1}$ to the register 1. The three inputs adder 5 has first, second and third input portions (each of which 8 bits). The first input portion of the three inputs adder 5 has the coefficient data $A_n$ from the register 1 input to it, the second input portion has the coefficient data $A_n$ of the register 1 for which one bit has been shifted up (data $2A_n$ which is twice $A_n$), input to it, and the third input portion has the coefficient data $B_n$ from the register 2 input to it. Four inputs adders 6 and 7 have first, second, third and fourth input portions (each of which is 8 bits). The first input portion of the four inputs adder 6 has the coefficient data $A_n$ from the register 1 input to it. The second input portion has the coefficient data $A_n$ for which one bit has been shifted up, input from the register 1. The third input portion has the coefficient data $B_n$ of the register 2 for which one bit has been shifted up (data $2B_n$ which is twice $B_n$), input to it. The fourth input portion has the coefficient data $C_n$ from the register 3, input to it. In the four input adders 7, the first, second, third and fourth input portions have the coefficient data $A_n$, $B_n$, $C_n$ and $D_n$ successively input from the registers 1, 2, 3 and 4.

In the above configuration, the three inputs adder 5 perform calculation of $$3A_n + B_n$$

and the four inputs adder 6 perform the calculation of $$3A_n + 2B_n + C_n$$

and the four inputs adder 7 perform the calculation of $$A_n + B_n + C_n + D_n.$$

Then, the results of calculation $(3A_n + B_n)$ of the three inputs adder 5 are returned to the register 2 as the new coefficient data $B_{n+1}$, the results of calculation $(3A_n + 2B_n + c_n)$ of the four inputs adder 6 are returned to the register 3 as the new coefficient data $C_{n+1}$ and the results of calculation $(A_n + B_n + C_n + D_n)$ of the four inputs adder 7 are returned to the register 4 as the new coefficient data $D_{n+1}$. The coefficient data $A_n$ stored in register 1, the results of calculation of the three inputs adder 5 and the results of calculation of the four inputs adders 6 and 7 are all expressed by the previous formula (5). This is to say that the results of calculation $(A_n + B_n + C_n + D_n)$ of the four inputs adder 7 become the results of calculation of the cubic equation $B_1(T)$ when $$T = n\left(B_1(t), t = \frac{n}{a}\right)$$

Figure 3:
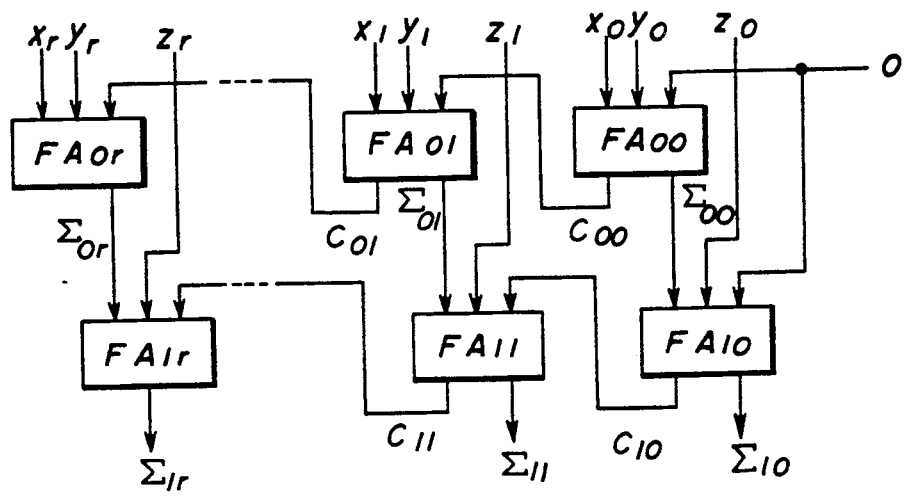
FIG. 3 and FIG. 4 are circuit diagrams indicating a configuration of a three inputs adder a four inputs adder indicated in FIG. 2.

A configuration of the three inputs adder 5 is shown in FIG. 3.

The three inputs adder 5 has a first group of full adders $FA_{00}$ through $FA_{0r}$ and a second group of full adders $FA_{10}$ through $FA_{1r}$. Each of full adders $FA_{0i}$ (i=0, 1, ..., r) of the first group calculate the sum of a bit $x_i$ of (r+1) bits data $x(x_0, x_1, ..., r)$, a bit $y_i$ of (r+1) bits data $y(y_0, y_1, ..., y_r)$ and a carryover $(C_{0i-1})$ from the previous stage full adder $FA_{0i-1}$. However, full adder $FA_{00}$ to which the LSB (least significant bit) $x_0$, $y_0$ of the data x and y are input has bit "0" input instead of the carryover. The linked (r+1) number of full adders $FA_{00}$ through $FA_{0r}$ performs the calculation of (x+y). The second group of full adders $FA_{1i}$(i=0, 1, ..., r) add the result of calculation $\Sigma_{0i}$(1 bit) of full adder $F_{0i}$, a bit $z_i$ of (r+1) bits data $z(z_0, z_1, ..., z_r)$ and the carryover $(C_{li-1})$ from the previous stage full adder $FA_{li-1}$. However, full adder $FA_{10}$ to which the LSB (least significant bit) $z_0$ of the data z is input has bit "0" input instead of the carryover.

Accordingly, the second group full adders $FA_{10}$ through $FA_{1r}$ perform the calculation of $\{(x+y)+z\}$.

Accordingly, the calculation output $\Sigma_{10}$ through $\Sigma_{1r}$ from second group full adders $FA_{10}$ through $FA_{1r}$ becomes the results of calculation $\Sigma(\Sigma_{10}, \Sigma_{11}, ..., \Sigma_{1r})$ of the three inputs adder 5. The three inputs adder 5 indicated in FIG. 2 perform the addition of the 8-bit coefficient data $(A_n+2A_n+B_n)$. This is to say that in FIG. 3, the circuit configuration of the actual three inputs adder 5 is for when r=7, x=An, y=$2A_n$ and z=$B_n$.

Figure 4:
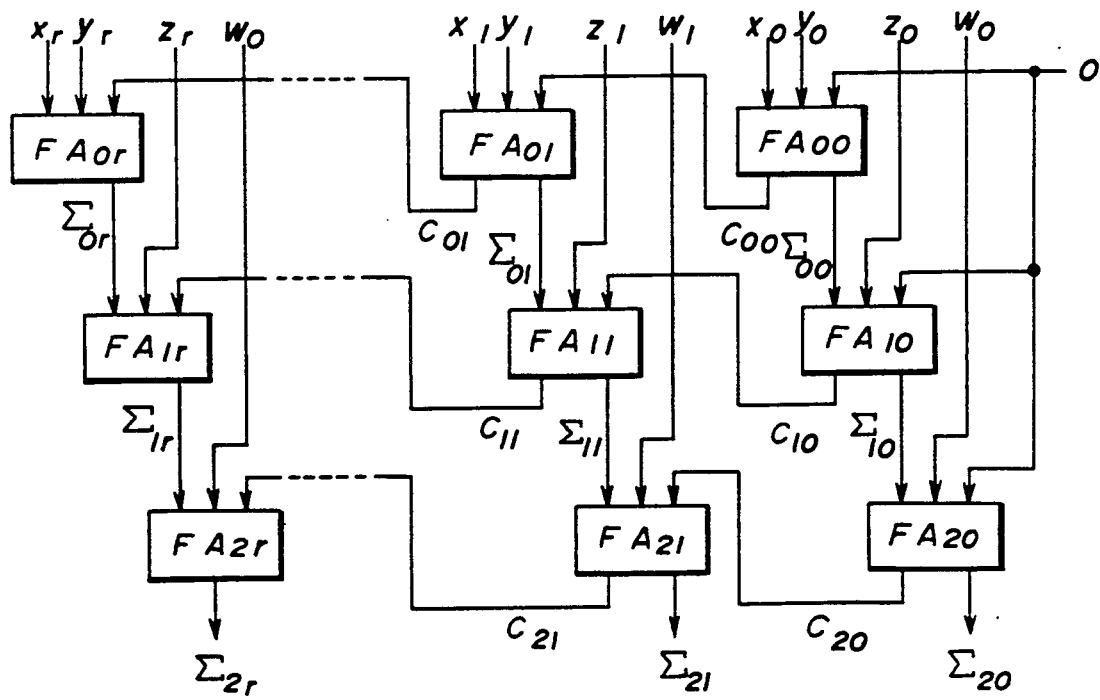

A circuit configuration of the four inputs adders 6 and 7 is the same and is shown in FIG. 4.

In the same way as for the three inputs adder 5, the four inputs adders 6 and 7 have a first group of full adders $FA_{00}$ through $FA_{0r}$ and a second group of full adders $FA_{10}$ through $AF_{1r}$. In addition, there is also a third group of full adders $FA_{20}$ through $FA_{2r}$. The configuration of the first group full adders $FA_{00}$ through $FA_{0r}$ and the second group full adders $FA_{10}$ through $FA_{1r}$ is the same as the configuration indicated in FIG. 3, and the calculation result $\{(x+y)+z\}$ is output from the (r+1) number of the second group of linked full adders $FA_{10}$ through $FA_{1r}$. The new third group full adder $FA_{2i}$(i=0, 1, ..., r) adds the results of calculation $\Sigma_{1i}$(1-bit) of the full adder $FA_{1i}$, a bit $w_i$ of (r+1) bits data $w(w_0, w_1, ..., w_r)$ and the carryover $C_{2i-1}$ from the previous stage full adder $FA_{1i-1}$. Instead of carryover, bit "0" is input to the full adder $FA_{20}$ to which the LSB $w_0$ of the data w is input. The linked (r+1) number of the third group of full adders $FA_{20}$ through $FA_{2r}$ performs the calculation of $\{(x+y+z)+w\}$. Accordingly, the results of calculation $\Sigma_{20}$ through $\Sigma_{2r}$ output from the third group of full adders $FA_{20}$ through $FA_{2r}$ becomes the results of calculation $\Sigma(\Sigma_{20}, \Sigma_{21}, ..., \Sigma_{2r})$ of the four inputs adders 6 and 7. The four inputs adder 6(7) indicated in FIG. 2 performs the addition $(A_n 2A_n+2B_n+C_n, A_nB_n+C_nD_n)$ of the 8-bit coefficient data. This is to say that in FIG. 4, the actual circuit configuration of the four inputs adder 6(7) is for when r=7, x=$A_n$, y=$2A_n(B_n)$, z=$2B_n(C_n)$ and w=$C_n(D_n)$. The calculation circuit 10 operates as described below. The calculation circuit 10 performs processing in synchronization with a predetermined clock (n).

Firstly, the coefficient data A, B, C and D of the cubic equations $$B_1(T) = AT^3 + BT^2 + CT + D$$

$$(B_1(t) = at^3 + bt^2 + ct + d)$$

is initially set in registers 1, 2, 3 and 4 ($A_1=A$, $B_1=B$, $C_1=C$, $D_1=D$). Then, at the timing of the clock (n=1), the result A+B+C+D is output from the four inputs adder circuit 7. This (A+B+C+D) becomes $$B_1(1) \text{ (or } B_1(t)\Big|_{t=\frac{1}{\alpha}}).$$

Then, at the timing of the clock (n=2), the coefficient data ($A_2=A$) is set as it is in the register 1, the results of calculation ($B_2=3A+B$) from the three inputs adder 5 are set in the register 2, the results of calculation ($C_2=3A+2B+C$) from the four inputs adder 6 are set in register 3, and the results of calculation ($D_2=A+B+C+D$) from the four inputs adder 7 are set in register 4. Then, $$A_2+B_2+C_2+D_2 = 8A+4B+2C+D$$

in output from the four inputs adder 7. This ($A_2+B_2+C_2+D_2$) becomes $$B_1(2) \text{ (or } B_1(t)\Big|_{t=\frac{2}{\alpha}}).$$

After this, the same processing is performed at the clock timing (n=3, 4, ...), and $B_3(T)$, $B_4(T)$, ... and output from the calculation circuit in synchronization with the clock (n). Then, C at the timing of the clock (n=a), the coefficient data ($A_{60}=A_{60-1}=A$) is set in register 1 in the same manner as before, the results of calculation ($B_{60}=3A_{\alpha-1}+B_{\alpha-1}$) from the three inputs adder 5 are set in register 2, and the results of calculation ($C_\alpha = 3A_{\alpha-1}+2B_{\alpha-1}+C_{\alpha-1}$) from the four inputs adder 6 are set in register 3, and the results of calculation ($D_\alpha = A_{\alpha-1}+B_{\alpha-1}+C_{\alpha-1}+D_{\alpha-1}$) from the four inputs adder 7 are set in register 4. Then, ($A_\alpha+B_\alpha+C_\alpha+D_\alpha$) are output from the four inputs adder 7. This ($A_\alpha+B_\alpha+C_\alpha+D_\alpha$) becomes for final calculation value $B_1(\alpha)$ (or $B_1(t)_{t=1}$).

As has been described above, the results of calculation $B_1(1)$, $B_1(2)$, ..., $B_1(\alpha)$ of the cubic equation $B_1(t)$ are successively output from the calculation circuit, in synchronization with the clock (n). In the same manner as has been described above, the calculation circuit 20 performs the calculation of $$B_2(T) = ET^3 + FT^2 + GT + H$$

$$(B_2(t) = et^3 + ft^2 + gt + h)$$

and the calculation circuit 30 performs the calculation of $$B_3(T) = IT^3 + JT^2 + KT + L$$

$$(B_3(t) = it^3 + jt^2 + kt + 1)$$

and the calculation circuit 40 performs the calculation of $$B_4(T) = MT^3 + NT^2 + OT + P$$

$$(B_4(t) = mt^3 + nt^2 + ot + p).$$

The calculated value $B_1(t)$ output from the calculation circuit 10 is input to multipliers 51 and 56, the calculated value $B_2(t)$ output from the calculation circuit 20 is input to multipliers 52 and 57, the calculated value B₃(t) output from the calculation circuit 30 is input to multipliers 53 and 58, and the calculated value B₄(t) output from the calculation circuit 40 is input to multipliers 54 and 59. Of the coordinate data (x₁, y₁), (x₂, y₂), (x₃, y₃) and (x₄, y₄) that are the four representative points that define the cubic curve, the x-coordinate value x₁, x₂, x₃ and x₄ are input to multipliers 51, 52, 53 and 54, and the y-coordinate values y₁, y₂, y₃ and y₄ are input to multipliers 56, 57, 58 and 59. Accordingly, the multiplied values $B_1(t)x_1$, $B_2(t)x_2$, $B_3(t)x_3$ and $B_4(t)x_4$ are output from the multipliers 51, 52, 53 and 54, and the multiplied values $B_1(t)y_1$, $B_2(t)y_2$, $B_3(t)y_3$ and $B_4(t)y_4$ are output from the multipliers 56, 57, 58 and 59. Then, the multiplied values $B_1(t)x_1$, $B_2(t)x_2$, $B_3(t)x_3$ and $B_4(t)x_4$ output from the multipliers 51, 52, 53 and 54 are supplied to the four inputs adder 55, and the results of calculation $$B_1(t)x_1 + B_2(t)x_2 + B_3(t)x_3 + B_4(t)x_4$$

are output from the four inputs adder 55. The result of this addition is the value of the x coordinate as expressed by the previous formula (1a). The multiplied values $B_1(t)y_1$, $B_2(t)y_2$, $B_3(t)y_3$ and $B_4(t)y_4$ output from the multipliers 56, 57, 58 and 59 are supplied to the four inputs adder 60, and the results of calculation $$B_1(t)ya_1 + B_2(t)y_2 + B_3(t)y_3 + B_4(t)y_4$$

are output from the four inputs adder 60. The results of this addition is the value of the y coordinate as expressed by the previous formula (1b).

In a coordinate data generation apparatus having the configuration as described above, the coordinate data (x, y) on the cubic curve defined by B₁(t), B₂(t), B₃(t) and B₄(t) and four representative points (x₁, y₁), (x₂, y₂), (x₃, y₃) and (x₄, y₄) are successively output. This coordinate data (x, y) is used to display a smooth cubic curve on a CRT or other display device In the above calculation circuits 10, 20, 30 and 40, the three inputs adder 5 performs three additions and the four inputs adders 6 and 7 both perform four additions each. Accordingly, if the processing time required for addition is represented by h, then the total calculation time becomes 11h, which is significantly less than the 53h which is the total time required for all processing in a conventional apparatus. In addition, the amount of hardware required for parallel processing is 111 which is significantly less than the 281 to 331 required by a conventional apparatus.

In the embodiment described above, the relationship between the parameter "T" and the parameter "t" is as has been described earlier, such that T=αt. Accordingly, the difference ΔT of the parameter T becomes $$\Delta T = \alpha \Delta t.$$

In an apparatus for the generation of data for coordinates on the cubic curve described above, B₁(T) is output for each increment of the clock (n) and so the difference ΔT in the parameter T is "1"(ΔT=1). This is to say that when ΔT is such that ΔT=1, $$\Delta t = \frac{1}{\alpha}$$

and so from when "t" is 0 to when "t" is 1, the chang of "t" is by $$\frac{1}{\alpha}$$

and the number of coordinate data obtained when thi occurs is α. For example, if α is set so that α=100, the a cubic curve will be displayed by 100 coordinat points. Normally, the value of α when ΔT=1, is deter mined so that there are no missing pixels (coordinat points) in the curve that is displayed on the basis of th coordinate data obtained.

However, as has been described above, when ΔT= and α is a set value, pixels will either be missing fo certain inclinations of complex curves or conversel pixels will overlap so that the speed of displaying of th curve will lower.

Even if the inclinations of all of the curves displayer have various changes, it is still desirable that the densit of the generated coordinate points be maintained th same for as much as this is possible.

Figure 5:
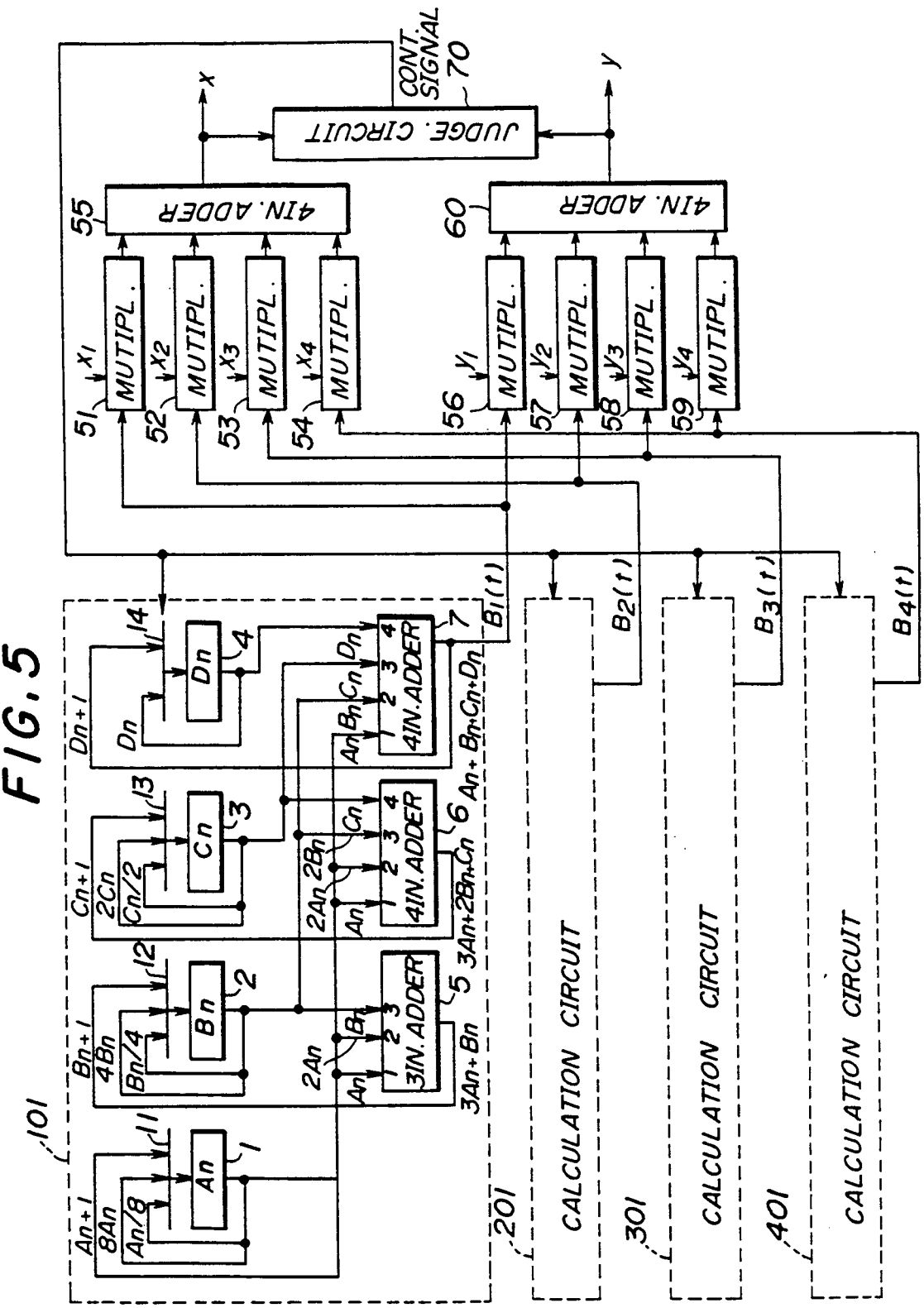
FIG. 5 is a circuit diagram indicating a second embodiment according to the present invention.

For this reason, the second embodiment according t the present invention is a coordinate data generatior apparatus with a circuit configuration having the addi tional function of changing the difference ΔT of th parameter T in accordance with the status of the curv which is to be displayed. FIG. 5 shows this seconc embodiment. In this embodiment, the difference ΔT o the parameter T can be selected to the three choices o $$\Delta T = 1, \Delta T = \tfrac{1}{2} \text{ or } \Delta T = 2.$$

The calculations when the difference ΔT=½ has beer selected are performed as follows.

In formula (3) above, when $$T = \frac{T}{2},$$

$$B_1\left(\frac{T}{2}\right) = \left(\frac{A}{8}\right)T^3 + \left(\frac{B}{4}\right)T^2 + \left(\frac{C}{2}\right)T + D \tag{6}$$

$B_1(\tfrac{1}{2})$ is calculated by substituting T=1 into the formula (6).

$$B_1\left(\frac{1}{2}\right) = \frac{A}{8} + \frac{B}{4} + \frac{C}{2} + D$$

This is to say that by replacing the coefficient data o the cubic equation with $\frac{A}{8}$ instead of A, $\frac{B}{4}$ instead of B, and $\frac{C}{2}$ instead of C, the calculated value $B_1(0+\frac{1}{2})$ in the formula (3) can be obtained for when there is the difference $\Delta T = \frac{1}{2}$ from $T=0$.

In general form, this means that the calculated value $B_1(n-\frac{1}{2})$ when there is the difference $$\Delta T = \frac{1}{2} \left( \Delta t = \frac{1}{2a} \right)$$

from $T=n-1$, can be obtained by replacing as follows.

$$\frac{A_n}{8} \text{ instead of } A_n \qquad (7)$$

$$\frac{B_n}{4} \text{ instead of } B_n$$

and $$\frac{C_n}{2} \text{ instead of } C_n$$

When the difference $\Delta T = 2$, the calculation is performed as follows.

In the formula (3) above, when $T=2T$, $$B_1(2T) = 8AT^3 + 4BT^2 + 2CT + D \qquad (8)$$

$B_1(2)$ is calculated by substituting $T=1$ into formula (8).

$$B_1(2) = 8A + 4B + 2C + D$$

This is to say that by replacing the coefficient data of the 8A instead of A, 4B instead of B, and 2C instead of C, the calculated value $B_1(0+2)$ can be obtained for when there is the difference $\Delta T = 2$ from $T=0$.

In general form, this means that the calculated value $B_1(n+1)$ when there is the difference $$\Delta T = 2 \left( \Delta t = \frac{2}{a} \right)$$

from $T=n-1$, can be obtained by replacing as follows.

$8A_n$ instead of $A_n$ $4B_n$ instead of $B_n$ and $\qquad (9)$ $2C_n$ instead of $C_n$ The circuit configuration indicated in FIG. 5 is as follows. The circuit configuration indicated in FIG. 5 uses the same numerals for parts which are the same as the configuration indicated in FIG. 2.

In the same manner as the calculation circuit 10 of the first embodiment, a calculation circuit 101 has registers 1, 2, 3, and 4 to store the coefficient data $A_n$, $B_n$, $C_n$, and $D_n$, a three inputs adder 5 to perform the calculation $(3A_n + B_n)$, a four inputs adder 6 to perform the calculation $(3A_n + 2B_n + C_n)$, and a four inputs adder 7 to perform the calculation $(A_n + B_n + C_n + D_n)$. The calculation circuit 101 also has multiplexers 11, 12, 13 and 14. The coefficient data $A_n$ stored in the register 1 is input as it is to multiplexer 11, as a new coefficient data $A_{n+1}$, and the data of the coefficient data $A_n$ stored in the register 1 and shifted three bits upwards (data $8A_n$ which is 8 times $A_n$) and the coefficient data $A_n$ shifted three bits downwards (data $$\frac{A_n}{8}$$

which is $\frac{1}{8}$ of $A_n$) is input to the multiplexer 11. At the three inputs adder 5, the results of calculation $(3A_n + B_n)$ is input to the multiplexer 12 as the new coefficient data $B_{n+1}$, and the coefficient data $B_n$ stored in the register 2 and shifted two bits upwards (data $4B_n$ which is 4 times $B_n$) and the coefficient data $B_n$ stored in the register2 and shifted two bits downwards (data $$\frac{B_n}{4}$$

which is $\frac{1}{4}$ times $B_n$) are input to the multiplexer 12. At the four inputs adder 6, the results of calculation $(3A_n + 2B_n + C_n)$ are input to the multiplexer 13 as the new coefficient data $C_{n+1}$. The coefficient data $C_n$ stored in register 3 and shifted one bit upwards (data $2C_n$ which is double $C_n$) and the coefficient data $C_n$ which is shifted one bit down (data $$\frac{C_n}{2}$$

which is $\frac{1}{2}$ times $C_n$) are input to the multiplexer 13. The results of calculation $(A_n + B_n + C_n + D_n)$ of the four inputs adder 7 are input to the multiplexer 14. The coefficient data $D_n$ stored in the register 4 is input as it is to the multiplexer 14. The multiplexers 11, 12 and 13 to which the three types of data have been input, and the multiplexer 14 to which two types of data have been input have their data selected control signals from a judgment circuit 70 and supplied to register 1, 2, 3 and 4. When the multiplexers 11, 12, 13 and 14 output the selected coefficient data $A_{n+1}$, $B_{n+1}$, $C_{n+1}$ and $D_{n+1}$, the calculation circuit 101 performs calculations in the same manner as the first embodiment, using the difference $\Delta T = 1$ for the parameter T.

In addition, when the multiplexers 11, 12, 13 and 14 output the selected data $$\frac{A_n}{8}, \frac{B_n}{4}, \frac{C_n}{2} \text{ and } D_n,$$

the calculation indicated by formula (7) above is performed for the difference $\Delta T = \frac{1}{2}$ of the parameter T and when the multiplexers 11, 12, 13 and 14 output the selected data $8A_n$, $4B_n$, $2C_n$ and $D_n$, the calculation indicated by formula (9) above is performed for the difference $\Delta T = 2$ of the parameter T.

The configuration of the calculation circuit 201 that performs the calculation of the cubic equation $B_2(t)$, the calculation circuit 301 that performs the calculation of the cubic equation $B_3(t)$, and the calculation circuit 401 that performs the calculation of the cubic equation $B_4(t)$, are all as indicated above for the calculation circuit 101.

The results of calculation $B_1(t)$, $B_2(t)$, $B_3(t)$ and $B_4(t)$ that are output from each of the calculation circuits 101, 201, 301 and 401 are supplied to the corresponding multipliers 51 through 54 and the multipliers 56 through 59 in the same manner as for the first embodiment, and the x-coordinate data satisfying formula (1a) is output from the four inputs adder 55, and y-coordinate data satisfying the formula (1b) is supplied form the four inputs adder 60.

The judgement circuit 70 compares the calculated coordinate data ($x_i$, $y_i$) with the coordinate data ($w_{i-1}$, $y_{i-1}$) calculated the previous time to judge whether or not there are any missing or overlapping pixels.

It is judged that there are missing pixels when $$|x_i - x_{i-1}| \geq 2 \text{ or}$$

$$|y_i - y_{i-1}| \geq 2 \quad (10)$$

and it is judged that there are overlapping pixels when $$x_i = x_{i-1} \text{ and}$$

$$y_i = y_{i-1} \quad (11)$$

The judgement circuit 70 output control signals corresponding to the above results of judgement. These control signals for example, comprise two bits and are (00) in the normal case, (10) when there are missing pixels, and (01) when there are overlapping pixels. The control signals from the judgement circuit 70 switch the multiplexers 11 through 14 of each of the calculation circuits 101, 201, 301, 401. Normally, when the control signals are (00), the multiplexers 11 through 14 output the coefficient data $A_{n+1}$, $B_{n+1}$, $C_{n+1}$ and $D_{n+1}$. When the control signals become (10) to indicate messing pixels, the multiplexers 11 through 14 switch the output to $$\frac{A_n}{8}, \frac{B_n}{4}, \frac{C_n}{2} \text{ and } D_n$$

and when the control signals become (01) to indicate overlapping pixels, the multiplexers 11 through 14 switch the output to $8A_n$, $4B_n$, $2C_n$ and $D_n$.

The following is s description of the operation of the apparatus to generate coordinate data on cubic curves.

Normally, the control signals from the judgement circuit 70 are (00) and the coefficient data $a_{n+1}$, $B_{n+1}$, $C_{n+1}$ and $D_{n+1}$ is set in the register 1 through 4. Accordingly, in the same manner as the first embodiment, the calculation circuits 101, 201, 301 and 401 perform the calculations for the difference $\Delta T = 1$, and those results of calculation $B_1(t)$, $B_2(t)$, $B_3(t)$ and $B_4(t)$ are output. The coordinate data (x, y) is then generated according to formula (1a) and (1b).

In the manner described above, with respect to the generated coordinate data ($x_i$, $y_i$), the generated coordinate data ($x_i$, $y_i$) is invalidated if the previously described conditions (10) are established (for missing pixels) and the control signals of the judgement circuit 70 switch from (00) to (10). If this occurs, then $$\frac{A_n}{8}, \frac{B_n}{4}, \frac{C_n}{2} \text{ and } D_n$$

are output from the multiplexers 11 through 14, and each of the calculation circuits 101, 201, 301 and 401 perform the calculation for $\Delta T = \frac{1}{2}$. Then, those results of calculation are used to generate new coordinate data ($x_i$, $y_i$).

In addition, in the normal process for generating the coordinate data using the results of calculation for when $\Delta T = 1$, the generated coordinate data ($x_j$, $y_j$) is invalidated if the previously described conditions (01) are established (for overlapping pixels) and the control signals of the judgement circuit 70 switch from (00) to (01). When this occurs, $8A_n$, $4B_n$, $2C_n$ and $D_n$ are output from the multiplexers 11 through 14, and each of the calculation circuits 101, 201, 301 and 401 perform the calculations for $\Delta T = 2$. Then, those results of calculation are used to generate new coordinate data ($x_j$, $y_j$).

As has been described above, and apparatus for generating data for coordinates on a cubic curve and relating to a second embodiment according to the present invention, the generated coordinate data is used as the basis for determining whether or not there are missing or overlapping pixels (coordinate points) for the cubic curve. The difference $\Delta T$ for the parameter T is changed ($\Delta T = 1$, $\Delta T = \frac{1}{2}$, $\Delta T = 2$) in accordance with this judgement so that the density of the generated coordinate points is maintained uniform even fi there are many types of changes in the inclination of the displayed curve. Accordingly, when curves are displayed on a CRT on the basis of the coordinate data, it is possible to prevent the missing pixels and lowering of the display speed due to pixels being overlapping.

In the first embodiment and the second embodiment described above, the calculated values $B_1(0) = D$, $B_2(0) = H$, $B_3(0) = L$ and $B_4(0) = P$ when $T = 0 (t = 0)$ are for example, supplied from a separate processing circuit to each of the multipliers 51 through 54 and 56 through 59 as initial values.

The value $\alpha$ that determines the fundamental density of generation of the coordinate points is determined arbitrarily in accordance with the quality of the curves that are to be displayed.

A calculation apparatus that switches between calculation when the difference $\Delta T = 1$ and calculation when $\Delta T = \frac{1}{2}$, and of a calculation apparatus that switches between calculation when the difference $\Delta T = 1$ and calculation when $\Delta T = 2$ can be readily realized by modifying the circuit as indicated in FIG. 5.

The present invention is not limited to the aforementioned embodiments, and variations and modifications may be made without departing from the scope of the invention.

What is claimed is:

1. A cubic equation calculation apparatus for calculating f(n) of a function when a cubic equation variable $T = n$ is defined by $$f(T) = AT^3 + BT^2 + CT + D$$

where A, B, C and D are constants, the apparatus comprising:

a first calculation circuit using a process where variable T is incremented by 1 from 1, for calculating coefficient data $A_n$, $B_n$, $C_n$ and $D_n$ when $T = n$ (n = 1, 2, . . .) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when $T = 1$ being such that $A_1'A$, $B_1 = B$, $C_1 = C$ and $D_1 = D$, and using coefficient data $A_{n-1}$, $B_{n-1}$, $C_{n-1}$ and $D_{n-1}$ when $T = n - 1$, and a second calculation circuit, operatively connected to an output of said first calculation circuit, for using the results of calculation of said first calculation circuit for calculating f(n) in accordance with $$f(n) = A_n + B_n + C_n + D_n$$

when $T = n$,
wherein said first calculation circuit includes:
first data storage means for storing coefficient data $A_n$,
second data storage means for storing coefficient data $B_n$,
third data storage means for storing coefficient data $C_n$,
fourth data storage means for storing coefficient data $D_n$,
a first data transfer circuit, operatively connected to said first data storage means, for transferring coefficient data $A_n$ stored in said first data storage means when $T = n$, to said first data storage means as the coefficient data $A_{n+1}$ when $T = n+1$,
a first coefficient data calculation circuit, operatively connected to said first data storage means and said second data storage means, for inputting coefficient data $A_n$ stored in said first data storage means and coefficient data $B_n$ stored in said second data storage means and for performing the calculation of $(3A_n + B_n)$,
a second data transfer circuit, operatively connected to said first data calculation circuit, for transferring data calculated by said first data calculation circuit when $T = n$, to said second data storage means as the coefficient data $B_{n+1}$ when $T = n+1$,
a second coefficient data calculation circuit, operatively connected to said first data storage means and said second data storage means and said third data storage means, for inputting coefficient data $A_n$ stored in said first data storage means and coefficient data $B_n$ stored in said second data storage means and coefficient data $C_n$ stored in said third data storage means and for performing the calculation of $(3A_n 2B_n + C_n)$,
a third data transfer circuit, operatively connected to said second data calculation circuit, for transferring data calculated by said second data calculation circuit when $T = n$, to said third data storage means as the coefficient data $C_{n+1}$ when $T = n+1$,
a third coefficient data calculation circuit, operatively connected to said first data storage means and said second data storage means and said third data storage means and said fourth data storage means, for inputting coefficient data $A_n$ stored in said first data storage means and coefficient data $B_n$ stored in said second data storage means and coefficient data $C_n$ stored in said third data storage means and coefficient data $D_n$ stored in said fourth data storage means and for performing the calculation of $(A_n + B_n + C_n + D_n)$, and
a fourth data transfer circuit, operatively connected to said third data calculation circuit, for transferring data calculated by said third data calculation circuit when $T = n$, to said fourth data storage means as the coefficient data $D_{n+1}$ when $T = n+1$,
wherein said second calculation circuit uses coefficient data stored in said first data storage means, said second data storage means, said third data storage means and said fourth data storage means to calculate $$f(n) = A_n + B_n + C_n + D_n.$$

2. The cubic equation calculation apparatus as claimed in claim 1, wherein:
said first data storage means, said second data storage means, said third data storage means and said fourth data storage means have, respectively, a first register, a second register, a third register and a fourth register storing binary coefficient data $A_n$, $B_n$, $C_n$ and $D_n$,
said first coefficient data calculation circuit is operatively connected to said first and second registers and has a first adding circuit to add binary coefficient data $A_n$ stored in said first register, binary coefficient data $2A_n$ which is binary coefficient data $A_n$ shifted one bit in the direction of a most significant bit position and binary coefficient data $B_n$ stored in said second register,
said second coefficient data calculation circuit is operatively connected to said first, second, and third registers and has a second adding circuit to add binary coefficient data $A_n$ stored in said first register, binary coefficient data $2A_n$ which is binary coefficient data $A_n$ shifted one bit in the direction of a most significant bit position and binary coefficient data $2B_n$ which is said binary coefficient data $B_n$ shifted one bit in the direction of a most significant bit position and binary coefficient data $C_n$ stored in said third register, and
said third coefficient data calculation circuit is operatively connected to said first, second, third and fourth registers and has a third adding circuit to add coefficient data $A_n$, $B_n$, $C_n$ and $D_n$ stored in said first register, said second register, said third register and said fourth register, respectively.

3. The cubic equation calculation apparatus as claimed in claim 2, wherein:
said first adding circuit includes a first group and second group of full adders, each of said full adders corresponding to each bit of added binary data and having three 1-bit input terminals, an 1-bit calculation output terminal and a carryover terminal, said 1-bit input terminals of each full adder of said first group having input to them a bit of a first added binary data, a bit of second added binary data corresponding to said bit of first added binary data, and a carryover bit from said carryover terminal of a full adder corresponding to a bit which is one-digit lower than said bit of the first added binary data input, said 1-bit input terminals of each full adder of said second group having input to them a calculation output bit from said calculation output terminal of a first group full adder corresponding to the same bit as said added binary data, a bit of a third added binary data, and a carryover bit from said carryover terminal of a full adder corresponding to a bit which is one-digit lower than said bit of the third added binary data input, and
binary coefficient data $A_n$, $2A_n$, and $B_n$ input to said first adding circuit become said first, second and third added binary data, respectively.

4. The cubic equation calculation apparatus as claimed in claim 2, wherein:

at least one of said second and third adding circuit includes a first group, a second group and a third group of full adders, each of said full adders corresponding to a bit of added binary data and having three 1-bit input terminals, an 1-bit calculation output terminal and a carryover terminal, said 1-bit input terminals of each full adder of said first group having input to them a bit of first added binary data, a bit of second added binary data corresponding to said bit of the first added binary data, and a carryover bit from said carryover terminal of a full adder corresponding to a bit which is one-digit lower than said bit of the first added binary data input, said 1-bit input terminals of each full adder of said second group having input to them a calculation output bit from said calculation output terminal of a first group full adder corresponding to the same bit as said added binary data, a bit of a third added binary data, and a carryover bit from said carryover terminal of a full adder corresponding to a bit which is one-digit lower than said bit of the third added binary data input, said 1-bit input terminals of each full adder of said third group having input to them a calculation output bit from said calculation output terminal of a second group full adder corresponding to the same bit as said added binary data, a bit of a fourth added binary data, and a carryover bit from said carryover terminal of a full adder corresponding to a bit which is one-digit lower than said bit of the fourth added binary data input, and at least one of binary coefficient $a_n$, $2A_n$, $2B_n$, $C_n$ and binary coefficient $A_n$, $B_n$, $C_n$, $D_n$ become said first, second, third and fourth added binary data.

5. The cubic calculation apparatus as claimed in claim 1, wherein said third coefficient data calculation circuit of said first calculation circuit is also used as said second calculation circuit.

6. A cubic equation calculation apparatus for calculating f(n) of a function when a cubic equation variable T=n is defined by $$f(T) = AT^3 + BT^2 + CT + D$$

where A, B, C and D are constants, the apparatus comprising:

a first calculation circuit using a process where variable T is incremented by 1 from 1, for calculating coefficient data $A_n$, $B_n$, $C_n$ and $D_n$ when T=n (n=1, 2, . . .) in accordance with $$A_n = A_{n-1}$$

$$B_n 3 A_{n-1} + B_{n-1}$$

$$C_n = 3 A_{n-1} + 2 B_{n-1} + C_{n-1}$$

$$D_n = A_{n-1} + B_{n-1} C_{n-1} + D_{n-1}$$

and using coefficient data $A_1$, $B_1$, $C_1$ and $D_1$ when T=1 being such that $A_1 = A$, $B_1 = B$, $C_1 = C$ and $D_1 = D$, and using coefficient data $A_{n-1}$, $B_{n-1}$, $C_{n-1}$ and $D_{n-1}$ when T=n−1;

a second calculation circuit, coupled to an output of said first calculation circuit, for using the results of calculation of said first calculation circuit for calculating f(n) in accordance with $$f(n) = A_n + B_n + C_n + D_n$$

when T=n;

a data conversion circuit, coupled to said first calculation circuit, using results of calculation of said first calculation circuit for generating data $A_n/8$, $B_n/4$ and $C_n/2$ and for respectively converting $A_n/8$ into new coefficient data $A_n$,
$B_n/4$ into new coefficient data $B_n$,
$C_n/2$ into new coefficient data $C_n$, and
$D_n$ into new coefficient data $D_n$; and a data selection circuit, coupled to said first calculation circuit and said data conversion circuit, for selectively supplying one of results of calculation of said first calculation circuit and coefficient data $a_n$, $B_n$, $C_n$ and $D_n$ obtained from said data conversion circuit, to said second calculation circuit;

wherein said second calculation circuit is coupled to said data selection circuit and uses coefficient data $A_n$, $B_n$, $C_n$ and $D_n$ supplied from said data selection circuit to calculate f(n) in accordance with $$f(n) = A_n + B_n C_n + D_n$$

when T=n.

7. The cubic equation calculation apparatus as claimed in claim 6, wherein:

(a) said first calculation circuit includes:

first data storage means for storing coefficient data $A_n$, second data storage means for storing coefficient data $B_n$, third data storage means for storing coefficient data $C_n$, fourth data storage means for storing coefficient data $D_n$, a first data transfer circuit, operatively connected to said first data storage means, for transferring coefficient data $A_n$ stored in said first data storage means when T=n, to said first data storage means as the coefficient data $A_{n+1}$ when T=n+1, a first coefficient data calculation circuit, operatively connected to said first and second data storage means, for inputting coefficient data $A_n$ stored in said first data storage mean and coefficient data $B_n$ stored in said second data storage means and for performing the calculation of $(3A_n + B_n)$, a second data transfer circuit, operatively connected to said first data calculation circuit, for transferring data calculated by said first data calculation circuit when T=n, to said second data storage means as the coefficient data $B_{n+1}$ when T=n+1, a second coefficient data calculation circuit, operatively connected to said first, second and third data storage means, for inputting coefficient data $A_n$ stored in said first data storage means and coefficient data $B_n$ stored in said second data storage means and coefficient data $C_n$ stored in said third data storage means and for performing the calculation of $(3A_n + 2B_n + C_n)$, a third data transfer circuit, operatively connected to said second data calculation circuit, for transferring data calculated by said second data calculation circuit when T=n, to said third data storage means as the coefficient data $C_{n+1}$ when T=n+1, a third coefficient data calculation circuit, operatively connected to said first, second, third and fourth data storage means, for inputting coefficient data An stored in said first data storage means and coefficient data $B_n$ stored in said second data storage means and coefficient data $C_n$ stored in said third data storage means and coefficient data $D_n$ stored in said fourth data storage means and for performing the calculation of $(A_n+B_n+C_n+D_n)$, and a fourth data transfer circuit, operatively connected to said third data calculation circuit, for transferring data calculated by said third data calculation circuit when $T=n$, to said fourth data storage means as the coefficient data $D_{n+1}$ when $T=n+1$;

(b) said data conversion circuit includes:

a first data re-transfer circuit, operatively connected to said first data storage means, for transferring data $A_n/8$ to said first data storage means so that coefficient data $A_n$ stored in said first data storage means when $T=n$ can be re-stored in said first data storage means as $A_n/8$, a second data re-transfer circuit, operatively connected to said second data storage means, for transferring data $B_n/4$ to said second data storage means so that coefficient data $B_n$ stored in said second data storage means when $T=n$ can be re-stored in aid second data storage means as $B_n/4$, a third data re-transfer circuit, operatively connected to said third data storage means, for transferring data $C_n/2$ to said third data storage means so that coefficient data $C_n$ stored in said third data storage means when $T=n$ can be re-stored in said third data storage means as $C_n/2$, and a fourth data re-transfer circuit, operatively connected to said fourth data storage means, to transfer data $D_n$ to said fourth data storage means so that coefficient data $D_n$ stored in said fourth data storage means when $T=n$ can be re-stored as it is in said fourth data storage means as $D_n$;

(c) said data selection circuit includes:

a data re-store selection circuit, operatively connected to said first, second, third and fourth data re-transfer circuits, for selecting whether or not said first data re-transfer circuit, said second data re-transfer circuit, said third data re-transfer circuit and said fourth data re-transfer circuit are to re-store data to said first data storage means, said second data storage means, said third data storage means and said fourth data storage means; and (d) said second calculation circuit is operatively connected to said first, second, third and fourth data storage means and uses coefficient data stored in said first data storage means, said second data storage means, said third data storage means and said fourth data storage means, to calculate $$f(n)=A_n+B_n+C_n+D_n.$$

8. A cubic equation calculation apparatus for calculating f(n) of a function when a cubic equation variable $T=n$ is defined by $$f(T)=AT^3+BT^2+CT+D$$

where A, B, C and D are constants, the apparatus comprising:

a first calculation circuit using a process where variable T is incremented by 1 from 1, for calculating coefficient data $A_n$, $B_n$, $C_n$ and $D_n$ when $T=n$ (n=1, 2, . . .) in accordance with $$A_n=A_{n-1}$$

$$B_n=3A_{n-1}+B_{n-1}$$

$$C_n=3A_{n-1}+2B_{n-1}+C_{n-1}$$

$$D_n=A_{n-1}+B_{n-1}+C_{n-1}+D_{n-1}$$

and using coefficient data $A_1$, $B_1$, $C_1$ and $D_1$ when $T=1$ being such that $A_1=A$, $B_1=B$, $C_1=C$ and $D_1=D$, and using coefficient data $A_{n-1}$, $B_{n-1}$, $C_{n-1}$ and $D_{n-1}$ when $T=n-1$;

a second calculation circuit, coupled to an output of said first calculation circuit, for using the results of calculation of said first calculation circuit for calculating f(n) in accordance with $$f(n)=A_n+B_n+C_n+D_n$$

when $T=n$;

a data conversion circuit, coupled to said first calculation circuit, using results of calculation of said first calculation circuit for generating data $8A_n$, $4B_n$ and $2C_n$ and for respectively converting $8A_n$ into new coefficient data $A_n$, $4B_n$ into new coefficient data $B_n$, $2C_n$ into new coefficient data $C_n$, and $D_n$ into new coefficient data $D_n$; and a data selection circuit, coupled to said first calculation circuit and said data conversion circuit, for selectively supplying one of results of calculation of said first calculation circuit and coefficient data $A_n$, $B_n$, $C_n$, and $D_n$ obtained from said data conversion circuit, to said second calculation circuit; wherein said second calculation circuit is coupled to said data selection circuit and uses coefficient data $A_n$, $B_n$, $C_n$ and $D_n$ supplied from said data selection circuit to calculate f(n) in accordance with $$f(n)=A_n+B_n+C_n+D_n$$

when $T=n$.

9. The cubic equation calculation apparatus as claimed in claim 8, wherein:

(a) said first calculation circuit includes:

first data storage means for storing coefficient data $A_n$, second data storage means for storing coefficient data $B_n$, third data storage means for storing coefficient data $C_n$, fourth data storage means for storing coefficient data $D_n$, a first data transfer circuit, operatively connected to said first data storage means, for transferring coefficient data $A_n$ stored in said first data storage means when $T=n$, to said first data storage means as the coefficient data $A_{n+1}$ when $T=n+1$, a first coefficient data calculation circuit, operatively connected to said first and second data storage means, for inputting coefficient data $A_n$ stored in said first data storage means and coefficient data $B_n$ stored in said second data storage means and for performing the calculation of $(3A_n+B_n)$, a second data transfer circuit, operatively connected to said first data calculation circuit, for transferring data calculated by said first data calculation circuit when T=n, to said second data storage means as the coefficient data $B_{n+1}$ when T=n+1, a second coefficient data calculation circuit, operatively connected to said first, second and third data storage means, for inputting coefficient data $A_n$ stored in said first data storage means and coefficient data $B_n$ stored in said second data storage means and coefficient data $C_n$ stored in said third data storage means and for performing the calculation of $(3A_n+2B_n+C_n)$, a third data transfer circuit, operatively connected to said second data calculation circuit, for transferring data calculated by said second data calculation circuit when T=n, to said third data storage means as the coefficient data $C_{n+1}$ when T=n+1, a third coefficient data calculation circuit, operatively connected to said first, second, third and fourth data storage means, for inputting coefficient data $A_n$ stored in said first data storage means and coefficient data $B_n$ stored in said second data storage means and coefficient data $C_n$ stored in said third data storage means and coefficient data $D_n$ stored in said fourth data storage means and for performing the calculation of $(A_n+B_n+C_n+D_n)$, and a fourth data transfer circuit, operatively connected to said third data calculation circuit, for transferring data calculated by said third data calculation circuit when T=n, to said fourth data storage mans as the coefficient data $D_{n+1}$ when T=n+1;

(b) said data conversion circuit includes:

a first data re-transfer circuit, operatively connected to said first data storage means, for transferring data $8A_n$ to said first data storage means so that coefficient data $A_n$ stored in said first data storage means when T=n can be re-stored in said first data storage means as $8A_n$, a second data re-transfer circuit, operatively connected to said second data storage means, for transferring data $4B_n$ to said second data storage means so that coefficient data $B_n$ stored in said second data storage means when T=n can be re-stored in said second data storage means as $4B_n$, a third data re-transfer circuit, operatively connected to third data storage means, for transferring data $2C_n$ to said third data storage means so that coefficient data $C_n$ stored in said third data storage means when T=n can be re-stored in said third data storage means as $2C_n$, and a fourth data re-transfer circuit, operatively connected to said fourth data storage means, to transfer data $D_n$ to said fourth data storage means so that coefficient data $D_n$ stored in said fourth data storage means when T=n can be re-stored as it is in said fourth data storage means as $D_n$;

(c) said data selection circuit includes:

a data re-store selection circuit, operatively connected to said first, second, third and fourth data re-transfer circuits, for selecting whether or not said first data re-transfer circuit, said second data re-transfer circuit, said third data re-transfer circuit and said fourth data re-transfer circuit are to re-store data to said first data storage means, said second data storage means, said third data storage means and said fourth data storage means; and (d) said second calculation circuit is operatively connected to said first, second, third and fourth data storage means and uses coefficient data stored in said first data storage means, said second data storage means, said third data storage means and said fourth data storage means, to calculate $$f(n) = A_n + B_n + C_n + D_n.$$

10. A cubic equation calculation apparatus for calculating f(n) of a function when a cubic equation variable T=n is defined by $$f(T) = AT^3 + BT^2 + CT + D$$

where A, B, C and D are constants, the apparatus comprising:

a first calculation circuit using a process where variable T is incremented by 1 from 1, for calculating coefficient data $A_n$, $B_n$, $C_n$ and $D_n$ when T=n (n=1, 2, . . .) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when T=1 being such that $A_1 = A$, $B_1 = B$, $C_1 = C$ and $D_1 = D$, and using coefficient data $A_{n-1}$, $B_{n-1}$, $C_{n-1}$ and $D_{n-1}$ and $D_{n-1}$ when T=n−1;

a second calculation circuit, coupled to an output of said first calculation circuit, for using the results of calculation of said first calculation circuit for calculating f(n) in accordance with $$f(n) = A_n + B_n + C_n + D_n$$

when T=n;

a first data conversion circuit, coupled to said first calculation circuit, using results of calculation of said first calculation circuit for generating data $A_n/8$, $B_n/4$ and $C_n/2$ and for respectively converting $A_n/8$ into new coefficient data $A_n$, $B_n/4$ into new coefficient data $B_n$, $C_n/2$ into new coefficient data $C_n$, and $D_n$ into new coefficient data $D_n$;

a second data conversion circuit, coupled to said first calculation circuit, using results of calculation of said first calculation circuit for generating data $8A_n$, $4B_n$ and $2C_n$ and for respectively converting $8A_n$ into new coefficient data $A_n$, $4B_n$ into new coefficient data $B_n$, $2C_n$ into new coefficient data $C_n$, $D_n$ into new coefficient data $D_n$; and a data selection circuit, coupled to said first calculation circuit and said first and second data conversion circuits, for selectively supplying one of results of calculation of said first calculation circuit and coefficient data $A_n$, $B_n$, $C_n$ and $D_n$ obtained from said first and second data conversion circuits, to said second calculation circuit;

wherein said second calculation circuit is coupled to said data selection circuit and uses coefficient data $A_n$, $B_n$, $C_n$ and $D_n$ supplied from said data selection circuit to calculate f(n) in accordance with $$f(n)=A_n+B_n+C_n+D_n$$

when T=n.

11. The cubic equation calculation apparatus as claimed in claim 10, wherein:

(a) said first calculation circuit includes;

first data storage means for storing coefficient data $A_n$, second data storage means for storing coefficient data $B_n$, third data storage means for storing coefficient data $C_n$, fourth data storage means for storing coefficient data $D_n$, a first data transfer circuit, operatively connected to said first data storage means, for transferring coefficient data $A_n$ stored in said first data storage means when T=n, to said first data storage means as the coefficient data $A_{n+1}$ when T=n+1, a first coefficient data calculation circuit, operatively connected to said first and second data storage means, for inputting coefficient data $A_n$ stored in said first data storage means and coefficient data $B_n$ stored in said second data storage means and for performing the calculation of $(3A_n+B_n)$, a second data transfer circuit, operatively connected to said first data calculation circuit, for transferring data calculated by said first data calculation circuit when T=n, to said second data storage means as the coefficient data $B_{n+1}$ when T=n+1, a second coefficient data calculation circuit, operatively connected to said first, second and third data storage means, for inputting coefficient data $A_n$ stored in said first data storage means and coefficient data $B_n$ stored in said second data storage means and coefficient data $C_n$ stored in said third data storage means and for performing the calculation of $(3A_n+2B_n+C_n)$, a third data transfer circuit, operatively connected to said second data calculation circuit, for transferring data calculated by said second data calculation circuit when T=n, to said third data storage means as the coefficient data $C_{n+1}$ when T=n+1, a third coefficient data calculation circuit, operatively connected to said first, second, third and fourth data storage means, for inputting coefficient data $A_n$ stored in said first data storage means and coefficient data $B_n$ stored in said second data storage means and coefficient data $C_n$ stored in said third data storage means and coefficient data $D_n$ stored in said fourth data storage means and for performing the calculation of $(A_n+B_n+C_n+D_n)$, and a fourth data transfer circuit, operatively connected to said third data calculation circuit, for transferring data calculated by said third data calculation circuit when T=n, to said fourth data storage means as the coefficient data $D_{n+1}$ when T=n+1;

(b) said first data conversion circuit includes:

a first data re-transfer circuit, operatively connected to said first data storage means, for transferring data $A_n/8$ to said first data storage means so that coefficient data $A_n$ stored in said first data storage means when T=n can be re-stored in said first data storage means as $A_n/8$, a second data re-transfer circuit, operatively connected to said second data storage means, for transferring data $B_n/4$ to said second data storage means so that coefficient data $B_n$ stored in said second data storage means when T=n can be re-stored in said second data storage means as $B_n/4$, a third data re-transfer circuit, operatively connected to said third data storage means, for transferring data $C_n/2$ to said third data storage means so that coefficient data $C_n$ stored in said third data storage means when T=n can be re-stored in said third data storage means as $C_n/2$, and a fourth data re-transfer circuit, operatively connected to said fourth data storage means, to transfer data $D_n$ to said fourth data storage means so that coefficient data $D_n$ stored in said fourth data storage means when T=n can be re-stored as it is in said fourth data storage means as $D_n$;

(c) said second data conversion circuit includes:

a fifth data re-transfer circuit, operatively connected to said first data storage means, for transferring data $8A_n$ to said first data storage means so that coefficient data $A_n$ stored in said first data storage means when T=n can be re-stored in said first data storage means as $8A_n$, a sixth data re-transfer circuit, operatively connected to said second storage means, for transferring data $4B_n$ to said second data storage means so that coefficient data $B_n$ stored in said second data storage means when T=n can be re-stored in said second data storage means as $4B_n$, and a seventh data re-transfer circuit, operatively connected to said third data storage means, for transferring data $2C_n$ to said third data storage means so that coefficient data $C_n$ stored in said third storage means when T=n can be re-stored in said third data storage means as $2C_n$;

(d) said data selection circuit includes:

a data re-store selection circuit, operatively connected to said first, second, third, fourth, fifth, sixth and seventh data re-transfer circuits, for selecting whether or not said first data re-transfer circuit, said second data re-transfer circuit, said third data re-transfer circuit and said fourth data re-transfer circuit are to restore data to said first data storage means, said second data storage means, said third data storage means and said fourth data storage means and selecting whether or not said fifth data re-transfer circuit, said sixth data re-transfer circuit, said seventh data re-transfer circuit and said fourth data re-transfer circuit are to restore data to said first data storage means, said second data storage means, said third storage means and said fourth storage means; and (e) said second calculation circuit, operatively connected to said first, second, third, and fourth data storage means, uses coefficient data stored in said first data storage means, said second data storage means, said third data storage means and said fourth data storage means, to calculate $$f(n)=A_n+B_n+C_n+D_n.$$

12. A cubic curve coordinate data generation apparatus, comprising:

a cubic equation calculation circuit for calculating f(n) of a function when a cubic equation variable T=n is defined by $$f(T)=AT^3+BT^2+CT+D$$

where A, B, C and D are constants, said cubic equation specifying a cubic curve; and a coordinate data calculation circuit, operatively connected to said cubic equation calculation circuit, for calculating coordinate data on said cubic curve on basis of f(n) calculated by said cubic equation calculation circuit;

said cubic equation calculation circuit having:

(a) a first calculation circuit using a process where variable T is incremented by 1 from 1, for calculating coefficient data $A_n$, $B_n$, $C_n$ and $D_n$ when T=n (n=1, 2, . . .) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when T=1 being such that $A_1=A$, $B_1=B$, $C_1=C$ and $D_1=D$, and using coefficient data $A_{n-1}$, $B_{n-1}$, $C_{n-1}$ and $D_{n-1}$ when T=n-1, and (b) a second calculation circuit, operatively connected to said first calculation circuit, for using the results of calculation of said first calculation circuit for calculating f(n) in accordance with $$f(n)=A_n+B_n+C_n+D_n$$

when T=n.

13. A cubic curve coordinate data generation apparatus, comprising:

a cubic equation calculation circuit for calculating f(n) of a function when a cubic equation variable T=n is defined by $$f(T)=AT^3+BT^2+CT+D$$

where A, B, C and D are constants, said cubic equation specifying a cubic curve; and a coordinate data calculation circuit, operatively connected to said cubic equation calculation circuit, for calculating coordinate data on said cubic curve on basis of f(n) calculated by said cubic equation calculation circuit;

said cubic equation calculation circuit having:

(a) a first calculation circuit using a process where variable T is incremented by 1 from 1, for calculating coefficient data $A_n$, $B_n$, $C_n$ and $D_n$ when T=n (n=1, 2, . . .) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when T=1 being such that $A_1=A$, $B_1=B$, $C_1=C$ and $D_1=D$, and using coefficient data $A_{n-1}$, $B_{n-1}$, $C_{n-1}$ and $D_{n-1}$ when T=n-1;

(b) a second calculation circuit, operatively connected to said first calculation circuit, for using the results of calculation of said first calculation circuit for calculating f(n) in accordance with $$f(n)=A_n+B_n+C_n+D_n$$

when T=n;

a judgement circuit, operatively connected to said coordinate data calculation circuit, for outputting a control signal when a distance between neighboring points on the cubic curve which are specified by coordinate data calculated by said coordinate data calculation circuit becomes equal to or larger than a predetermined distance; wherein:

(a) said cubic equation calculation circuit further comprising:

a data conversion circuit, operatively connected to said first calculation circuit, using results of calculation of said first calculation circuit for generating data $A_n/8$, $B_n/4$ and $C_n/2$ and for respectively converting $A_n/8$ into new coefficient data $A_n$, $B_n/4$ into new coefficient data $B_n$, $C_n/2$ into new coefficient data $C_n$, and $D_n$ into new coefficient data $D_n$; and a data selection circuit, operatively connected to said first calculation circuit, said judgement circuit, and said data conversion circuit, for selectively supplying the result $A_n$, $B_n$, $C_n$ and $D_n$ of calculation of said first calculation circuit when said control signal is not output from said judgement circuit and coefficient data $A_n$, $B_n$, $C_n$ and $D_n$ obtained from said data conversion circuit when said control signal is output from said judgement circuit, to said second calculation circuit; and (b) said second calculation circuit is operatively connected to said data selection circuit and uses coefficient data $A_n$, $B_n$, $C_n$ and $D_n$ supplied from said data selection circuit to calculate f(n) in accordance with $$f(n)=A_n+B_n+C_n+D_n$$

when T=n.

14. A cubic curve coordinate data generation apparatus, comprising:

a cubic equation calculation circuit for calculating f(n) of a function when a cubic equation variable T=n is defined by $$f(T)=AT^3+BT^2+CT+D$$

where A, B, C and D are constants, said cubic equation specifying a cubic curve; and a coordinate data calculation circuit, operatively connected to said cubic equation calculation circuit, for calculating coordinate data on said cubic curve on basis of f(n) calculated by said cubic equation calculation circuit;

said cubic equation calculation circuit having:

(a) a first calculation circuit using a process where variable T is incremented by 1 from 1, for calculating coefficient data $A_n$, $B_n$, $C_n$ and $D_n$ when T=n (n=1, 2, . . .) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when $T=1$ being such that $A_1=A$, $B_1=B$, $C_1=C$ and $D_1=D$, and using coefficient data $A_{n-1}$, $B_{n-1}$, $C_{n-1}$ and $D_{n-1}$ when $T=n-1$;

(b) a second calculation circuit, operatively connected to said first calculation circuit, for using the results of calculation of said first calculation circuit for calculating f(n) in accordance with $$f(n) = a_n + B_n + C_n + D_n$$

when $T=n$;

a judgement circuit, operatively connected to said coordinate data calculation circuit, for outputting a control signal when two points on the cubic curve which are specified by coordinate data calculated by said coordinate data calculation circuit are overlapped; wherein:

(a) said cubic equation calculation circuit further comprises:

a data conversion circuit, operatively connected to said first calculation circuit using results of calculation of said first calculation circuit for generating data $8A_n$, $4B_n$ and $2C_n$ and for respectively converting $8A_n$ into new coefficient data $A_n$, $4B_n$ into new coefficient data $B_n$, $2C_n$ into new coefficient data $C_n$, and $D_n$ into new coefficient data $D_n$; and a data selection circuit, operatively connected to said first calculation circuit, said judgement circuit, and said data conversion circuit, for selectively supplying the result $A_n$, $B_n$, $C_n$ and $D_n$ of calculation of said first calculation circuit when said control signal is not output from said judgement circuit and coefficient data $A_n$, $B_n$, $C_n$ and $D_n$ obtained form said data conversion circuit when said control signal is output from said judgement circuit, to said second calculation circuit; and (b) said second calculation circuit is operatively connected to said data selection circuit and uses coefficient data $A_n$, $B_n$, $C_n$ and $D_n$ supplied from said data selection circuit to calculate f(n) in accordance with $$f(n) = A_n + B_n + C_n + D_n$$

when $T=n$.

15. A cubic curve coordinate data generation apparatus, comprising:

a cubic equation calculation circuit for calculating f(n) of a function when a cubic equation variable $T=n$ is defined by $$f(T) = AT^3 + BT^2 + CT + D$$

where A, B, C and D are constants, said cubic equation specifying a cubic curve; and a coordinate data calculation circuit, operatively connected to said cubic equation calculation circuit, for calculating coordinate data on said cubic curve on basis of f(n) calculated by said cubic equation calculation circuit;

said cubic equation calculation circuit having:

(a) a first calculation circuit using a process where variable T is incremented by 1 from 1, for calculating coefficient data $A_n$, $B_n$, $C_n$ and $D_n$ when $T=n$ (n=1, 2, ... ) in accordance with $$A_n = A_{n-1}$$

$$B_n = 3A_{n-1} + B_{n-1}$$

$$C_n = 3A_{n-1} + 2B_{n-1} + C_{n-1}$$

$$D_n = A_{n-1} + B_{n-1} + C_{n-1} + D_{n-1}$$

and using coefficient data $A_1$, $B_1$, $C_1$ and $D_1$ when $T=1$ being such that $A_1=A$, $B_1=B$, $C_1=C$ and $D_1=D$, and using coefficient data $A_{n-1}$, $B_{n-1}$, $C_{n-1}$ and $D_{n-1}$ when $T=n-1$;

(b) a second calculation circuit, operatively connected to said first calculation circuit, for using the results of calculation of said first calculation circuit for calculating f(n) in accordance with $$f(n) = A_n + B_n + C_n + D_n$$

when $T=n$;

a judgement circuit, operatively connected to said coordinate data calculation circuit, for outputting a first control signal when a distance between neighboring points on the cubic curve which are specified by coordinate data calculated by said coordinate data calculation circuit becomes equal to or larger than a predetermined distance, and for outputting a second control signal when two points on the cubic curve which are specified by coordinate data calculated by said coordinate data calculation circuit are overlapped; wherein:

(a) said cubic equation calculation circuit further comprises:

a first data conversion circuit, operatively connected to said first calculation circuit, using results of calculation of said first calculation circuit for generating data $A_n/8$, $B_n/4$ and $C_n/2$ and for respectively converting $A_n/8$ into new coefficient data $A_n$, $B_n/4$ into new coefficient data $B_n$, $C_n/2$ into new coefficient data $C_n$, and $D_n$ into new coefficient data $D_n$;

a second data conversion circuit, operatively connected to said first calculation circuit, using results of calculation of said first calculation circuit for generating data $8A_n$, $4B_n$ and $2C_n$ and for respectively converting $8A_n$ into new coefficient data $A_n$, $4B_n$ into new coefficient data $B_n$, $2C_n$ into new coefficient data $C_n$, and $D_n$ into new coefficient data $D_n$; and a data selection circuit, operatively connected to said first calculation circuit, said judgement circuit, and said first data conversion circuit, and said second conversion circuit, for selectively supplying the result $A_n$, $B_n$, $C_n$ and $D_n$ of calculation of said first calculation circuit when said first and second control signals are not output from said judgement circuit and coefficient data $A_n$, $B_n$, $C_n$ and $D_n$ obtained from said first data conversion circuit when said first control signal is output from said judgement circuit and coefficient data $A_n$, $B_n$, $C_n$ and $D_n$ obtained from said second data conversion circuit when said second signal is output from said judgement circuit, to said second calculation circuit; and (b) said second calculation circuit is operatively connected to said data selection circuit and uses coefficient data $A_n$, $B_n$, $C_n$ and $D_n$ supplied from said data selection circuit to calculate f(n) in accordance with $$f(n) = A_n + B_n + C_n + D_n$$

when T=n.

* * * * *

UNITED STATES PATENT AND TRADEMARK OFFICE
CERTIFICATE OF CORRECTION

PATENT NO. : 5,060,181
DATED : October 22, 1991
INVENTOR(S) : Shigeki Matsuoka It is certified that error appears in the above-identified patent and that said Letters Patent is hereby corrected as shown below:

On the title page, Item [75]

Please delete the name of the inventor "Sigeki Matsuoka" listed on the Letters Patent, and insert the correct name of --Shigeki Matsuoka--.

Signed and Sealed this

Ninth Day of March, 1993

Attest:

STEPHEN G. KUNIN

*Attesting Officer*     *Acting Commissioner of Patents and Trademarks*